(12) United States Patent
Graham et al.

(10) Patent No.: US 10,600,128 B2
(45) Date of Patent: Mar. 24, 2020

(54) MOBILE EXPENSE REPORT SYSTEM

(71) Applicants: Robert William Graham, Springboro, OH (US); David Johnson, Mason, OH (US)

(72) Inventors: Robert William Graham, Springboro, OH (US); David Johnson, Mason, OH (US)

(*) Notice: Subject to any disclaimer, the term of this patent is extended or adjusted under 35 U.S.C. 154(b) by 777 days.

(21) Appl. No.: 13/730,999

(22) Filed: Dec. 29, 2012

(65) Prior Publication Data

US 2014/0188673 A1    Jul. 3, 2014

(51) Int. Cl.
*G06Q 40/00* (2012.01)
*G06Q 20/20* (2012.01)

(52) U.S. Cl.
CPC ............. *G06Q 40/10* (2013.01); *G06Q 40/12* (2013.12)

(58) Field of Classification Search
USPC ................................................ 705/30, 39, 16
See application file for complete search history.

(56) References Cited

U.S. PATENT DOCUMENTS

| | | | |
|---|---|---|---|
| 2009/0150265 A1* | 6/2009 | Keld | G06Q 10/10 705/30 |
| 2012/0143702 A1* | 6/2012 | Ho | G06Q 20/10 705/16 |
| 2012/0144461 A1* | 6/2012 | Rathbun | H04L 9/3213 726/5 |

* cited by examiner

*Primary Examiner* — Oluseye Iwarere
*Assistant Examiner* — Reva R Danzig
(74) *Attorney, Agent, or Firm* — R. William Graham

(57) ABSTRACT

A hand held computer based device includes expense transaction software equipped with an electronic (near field) communication device to receive an electronic signal and wherein the expense transaction software obtains transaction information data in the electronic signal for either storing locally on the hand held computer based device or transmitting the transaction information data to a remotely located processor.

5 Claims, 4 Drawing Sheets

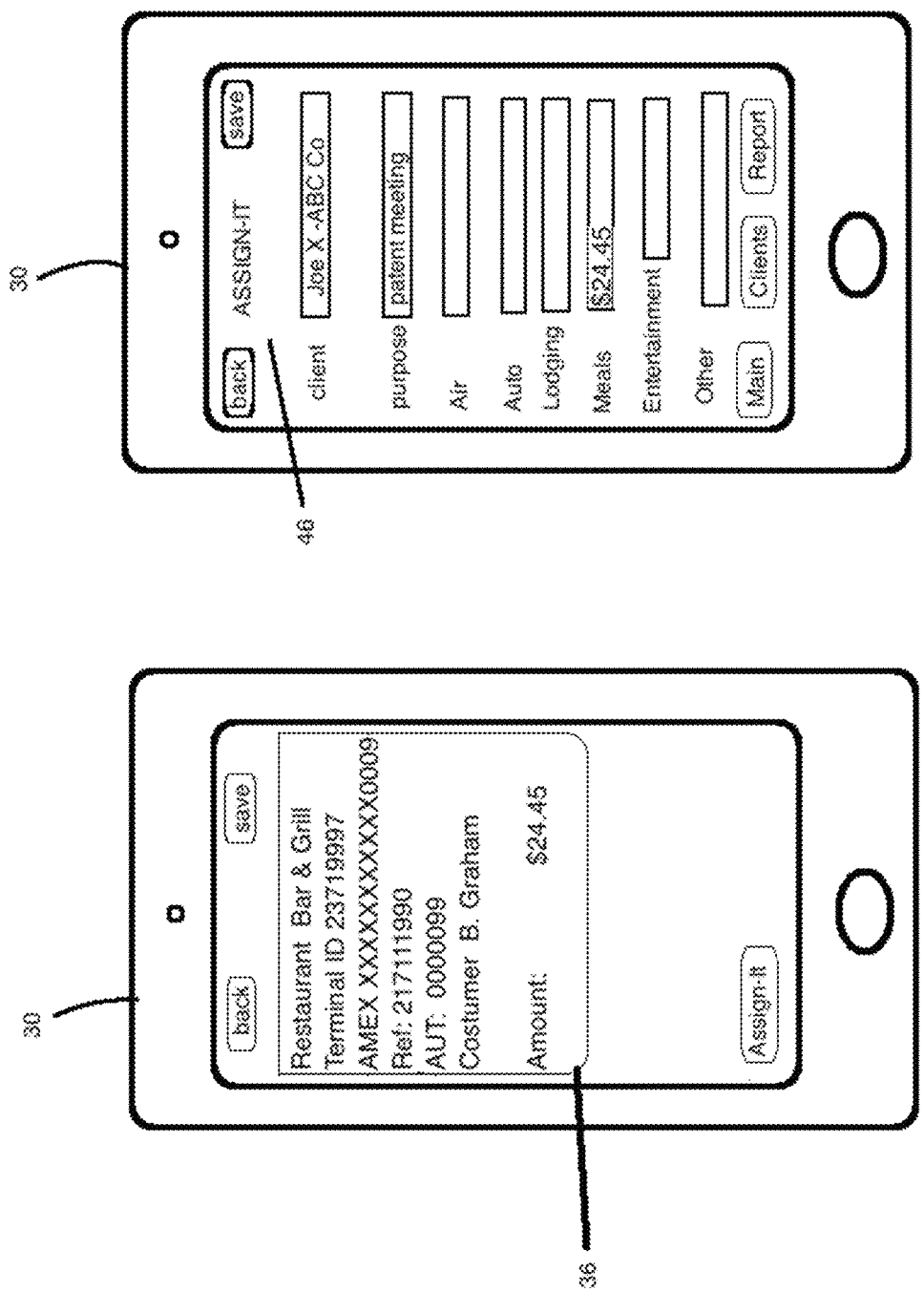

MOBILE EXPENSE REPORT SYSTEM

This application claims the benefit of U.S. Ser. No. 61/730,815 filed 28 Nov. 2012.

The invention is directed to an improved method of tracking expenses. More particularly, the invention is directed to a system and process for tracking expenses employing in part a hand held computer.

The current method of tracking expenses typically includes gathering various receipts as they are incurred from the inception of a business trip, for example, and then manually entering each of the costs into a spreadsheet format using a computer or hand writing them and then stapling receipts to the spreadsheet or employing a scanner to scan in the receipts thereby digitally recording the images of the same. This however is a lengthy process and requires entry of the raw data in any event.

There have been some systems which have improved on such tracking by providing an image scanning device which takes a picture of receipts and uses optical character recognition software to recognize data and provide the data back in a usable form. However, many times the software is incapable of recognizing such data and/or converting such data in a useful way, particularly when traveling abroad and dealing with foreign currency exchange.

The instant invention substantially reduces workload associated with such prior techniques.

SUMMARY OF THE INVENTION

It is an object to improve systems and methods of tracking expenses.

It is another object to provide a system and process for tracking expenses.

Accordingly, the invention is directed to system for tracking expenses. The system includes a transaction point which is equipped with a processor, the processor having an electronic communication device therewith (e.g., a near field communication device or optic device) which generates an electronic signal transaction information data. The processor can also preferably include a media (in the form of a media display or print out) wherein upon a purchase transaction being made at the transaction point, which on the media (e.g. a receipt) and includes details of the transaction, such as location, product or service purchased, amount, date, time, etc. The invention further includes a hand held smart phone which includes application, expense transaction software, which is equipped with a complementary communication device, for example a near field communication device, an optic device and software for optionally scanning the computer readable code thereby gathering the transaction information data, wherein the hand held smart phone can store data locally on the smart phone and/or transmit the same to a remotely located processor. It is also contemplated that the smart phone can provide credit authorization data in other manners such as a with its screen which can be scanned by the optic device on the processor at the transaction point. The expense transaction software is also preferably equipped to enable manual input of data into a file, such as a note regarding the transaction, or enables associating data with a particular transaction.

In one embodiment, the invention is directed to a system for tracking expenses, which includes:

a transaction point which is equipped with a processor, transaction software operably associated with the processor, a near field communication device, where upon a purchase transaction being made at the transaction point, the processor utilizes the near field communication device and transaction software to generate an electronic signal including transaction information data pertaining to the purchase; and a hand held computer based device which includes expense transaction software equipped with a near field communication device and is operably connected to receive the electronic signal and the expense transaction software obtains the transaction information data from the electronic signal for one of storing locally on the hand held computer based device or transmitting the transaction information data to a remotely located processor. In another aspect of invention, there is provided a hand held computer based device which includes expense transaction software equipped with a near field communication device to receive the electronic signal and wherein the expense transaction software obtains the transaction information data for either storing locally on the hand held computer based device or transmitting the transaction information data to a remotely located processor.

Another embodiment is directed to a system for tracking expenses, which includes:

a transaction point which is equipped with a processor, transaction software operably associated with said processor, a media for displaying transaction information data in a computer readable image code, whereupon a purchase transaction being made at said transaction point, said processor utilizes said expense transaction software to generate on said media said computer readable image code; and a computer based device which includes expense transaction software equipped with an optic device and operably connected therewith, and upon initiating the expense transaction software application, the optic device is employed for scanning said computer readable image code thereby gathering the transaction information data therefrom and one of storing locally on said computer based device and transmitting the transaction information data to a remotely located processor whereby said computer readable image code is converted into human readable format.

BRIEF DESCRIPTION OF THE DRAWINGS

FIG. 3A depicts a hand held device of the invention showing a third screen.

FIG. 4A depicts a hand held device of the invention showing a fifth screen.

DETAILED DESCRIPTION OF THE INVENTION

Figure 6:
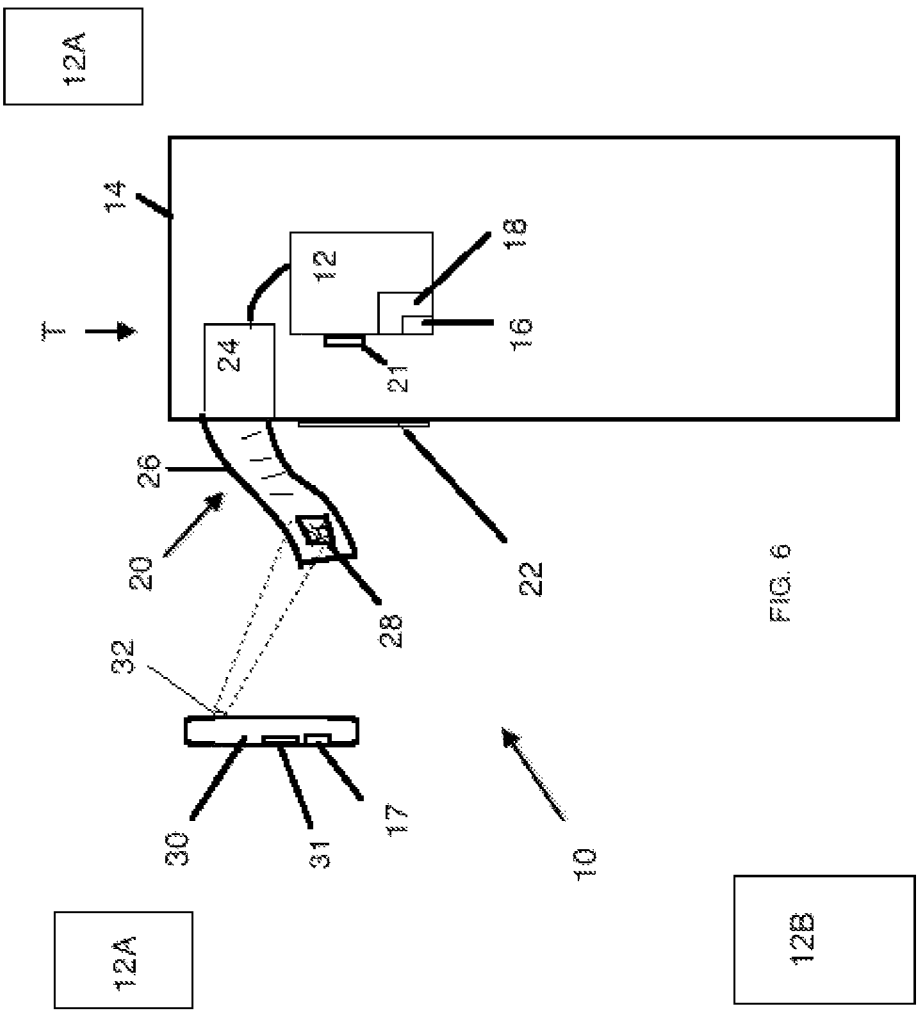
FIG. 6 depicts a schematic of one aspect of the instant invention.
Figure 5:
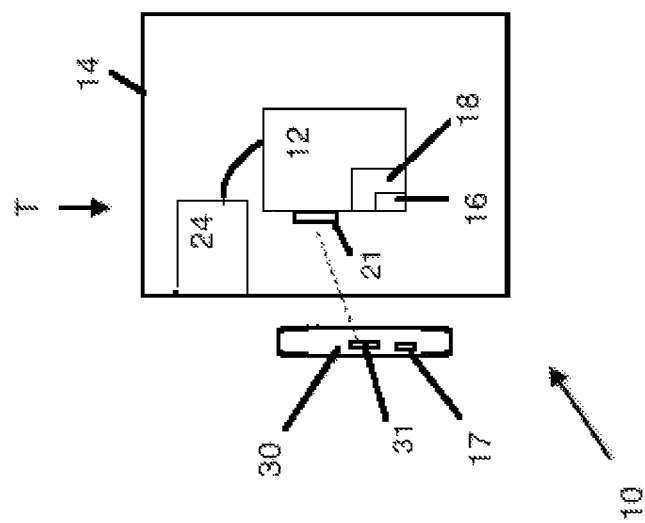
FIG. 5 depicts a schematic of one aspect of the instant invention.

Referring now to the drawings, the invention is directed to system for tracking expenses and is generally referred to by the numeral 10. The system 10 takes place at a transaction point T which is equipped with a processor 12 (which as seen in FIGS. 5 and 6 can reside at the transaction point T within a computer based device 14, such as a register or kiosk, for example, or be a remotely operably associated computer based device (12A). The computer based device 12 can include transaction software 16 on memory 18 thereof or be operably associated with transaction software of the processor 12A. In one aspect of the invention, the computer based device 14 can be equipped with a near field communication (NFC) device 21, for transmitting transaction information data related to a purchase of a good or service for example. In this embodiment, no visible media form is required, rather, the data is transmitted electronically via near field communication. It is contemplated that some other form of secure electronic signal can be used in the alternative to near field communication.

In another embodiment or in addition to the above, a media 20 can be used in the form of a media display 22 and/or printer 24 and with paper 26, e.g. thermal paper can be employed to convey the transaction information data. The transaction point T can be any retail point, contemplating on-line as well as conventional retail markets (gas station, retail store, food and beverage provider, travel service provider, etc.).

Upon a purchase transaction being made at the transaction point T, the processor 12 utilizes the transaction software 16 to generate an electronic signal including the transaction information data. The electronic signal can be transmitted (e.g. via NFC wirelessly) for direct use by hand held computer based device 30 having a NFC device (chip) 31 as seen in FIG. 5 and/or used by computer based device 14 for displaying on media 20 (here shown on paper 26 but could be on LCD panel 22 or the like) for subsequent use by hand held computer based device 30 as seen in FIG. 6.

The media 20 can display the transaction information data as a computer readable image code such as a bar or QR code 28 which includes details of the transaction information data, such as location, product or service purchased, merchant information, amount, date, time, etc. By "computer readable image code" inventor contemplates and readable code employing electronic computer based device, such as computer generated coded image, such as a QR code or Bar Code, or electronic signal, which has taken the real time transaction data and puts the real time transaction data into such format to enable a computer (such as hand held computer based device 30) to use high speed data manipulation.

The invention includes hand held computer based device 30, such as a smart phone, which can preferably include a complementary secure communication device, such as near field communication (NFC) device 31, and further includes expense transaction software 17 which can be in the form of an application used by the user on the smart phone 30.

In the case of the computer based device 12 and hand held computer based device 30 including NFC devices, the expense transaction software 17 can be manually or automatically initiated upon the transaction information data electronic signal being detected on the hand held computer based device 30.

Figure 1:
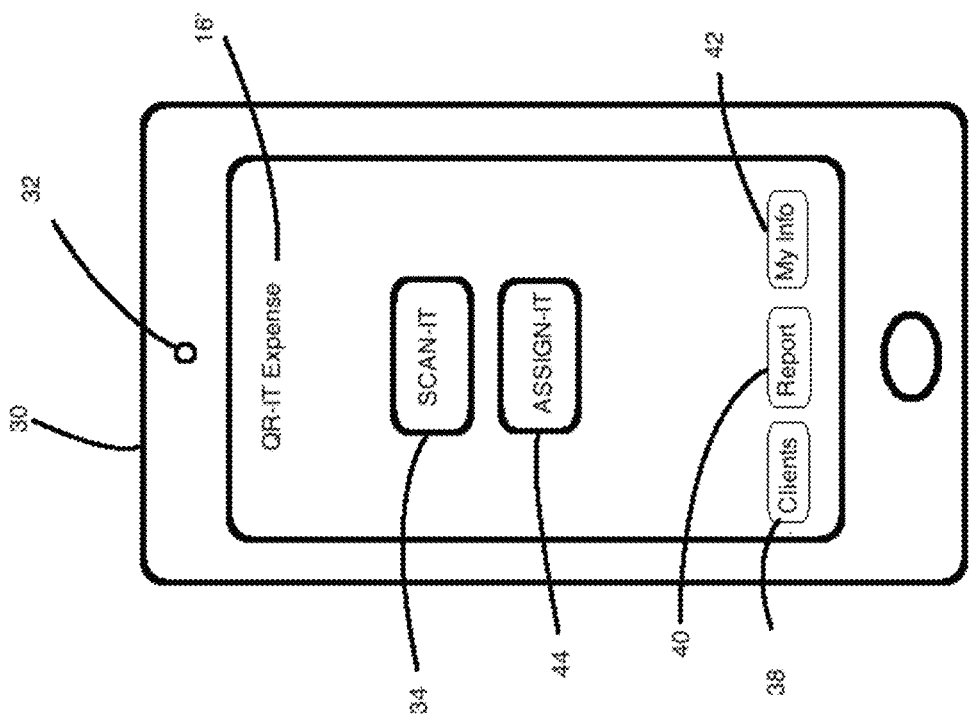
FIG. 1 depicts a hand held device of the invention showing a first screen.
Figure 3B:
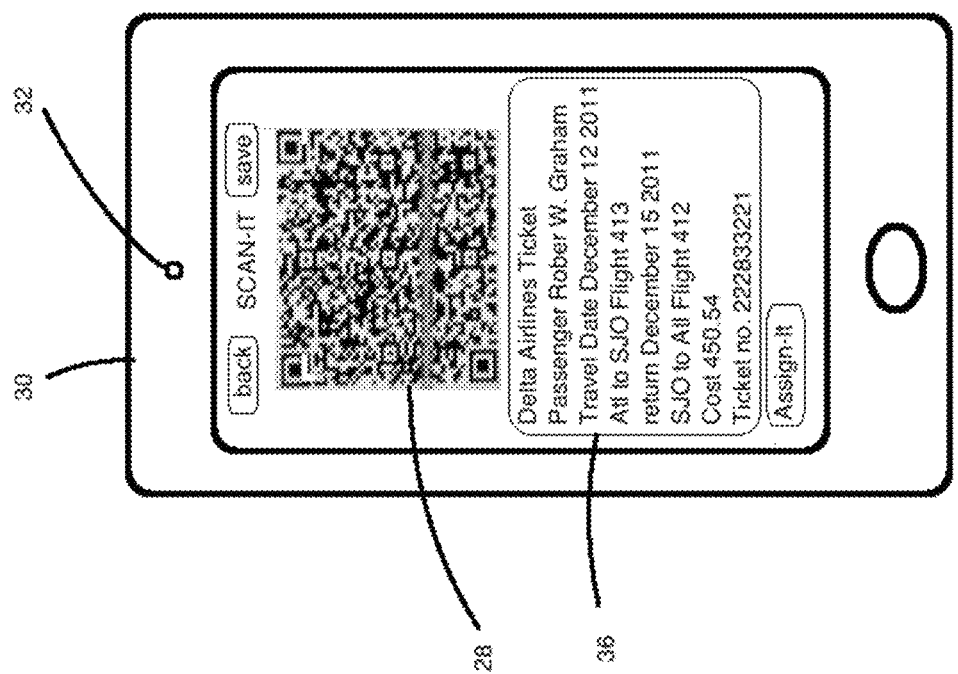
FIG. 3B depicts a hand held device of the invention showing a fourth screen.

Hand held computer based device 30 can also be equipped with an optic device 32 and works together with expense transaction software 17 such that upon initiating the expense transaction software 17 application on the hand held computer based device 30, the expense transaction software 17 gathers the transaction information data (either from the electronic signal (NFC) or from the code 28 using the optic device 32 which can be employed for scanning the code 28 by touching (initiating) "Scan-it" button 34 on screen of phone 30 as illustrated in FIG. 1 and by positioning the code 28 in the correct position and field of view of the optic device 32) and can store locally on the hand held computer based device 30 and/or transmit the same to a remotely located processor 12B whereby the transaction information data is converted into a human readable form 36 (e.g., as seen in FIGS. 3A and 3B) either by the expense transaction software 17 residing on the hand held computer based device 30 or by complementary expense transaction software residing on remote processor 12B, for printing or later retrieval. The hand held computer based device 30 can preferably include transaction authority data, such as credit card information data, which is transmitted via NFC device 31 to NFC device 21 for purpose of making a purchase transaction.

Figure 2:
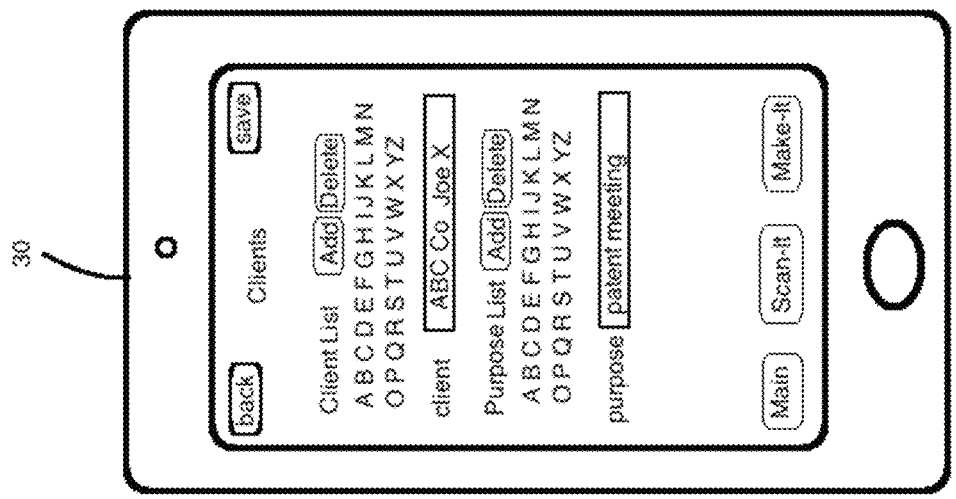
FIG. 2 depicts a hand held device of the invention showing a second screen.

Further, the expense transaction software 17 provides for a clients button 38 which when touching (initiating) brings up a screen as depicted in FIG. 2. Herein, the user can add/delete clients and purposes of expense to be tracked, and these can be stored in manner to be later retrieved and used at a later date for purposes of assigning the transaction information data 36 to a particular client and stated purpose. The human readable format data can be printed or stored as desired by the user. The expense transaction software 17 can store and log all such data in a sorted manner to enable quick and easy viewing of such data by client, purpose, date, merchant, good and/or service by touching (initiating) the report button 40 which brings up a screen enabling the viewing of such data and printing, e-mailing or exporting the same in a variety of report formats. A "my info" button 42 is also provided wherein the expense transaction software 17 which upon touching (initiating) enables entry of user personal information for tracking expenses, such as your name, company/companies, address(es), telephone number(s), e-mail(s), etc, and can preferably be automatically obtained from user information from the smart phone 30 and which can be edited.

Once the transaction information data is obtained via electronic signal electronic signal or via code 28 scanned (FIG. 3A or 3B showing transaction information data 36), then the user can be automatically prompted (a screen 46 seen in FIGS. 4A and 4B) to assign the expense. For purposes of the invention, "tagging" can refer to marking, editing, adding or annotating the transaction information data.

Figure 4B:
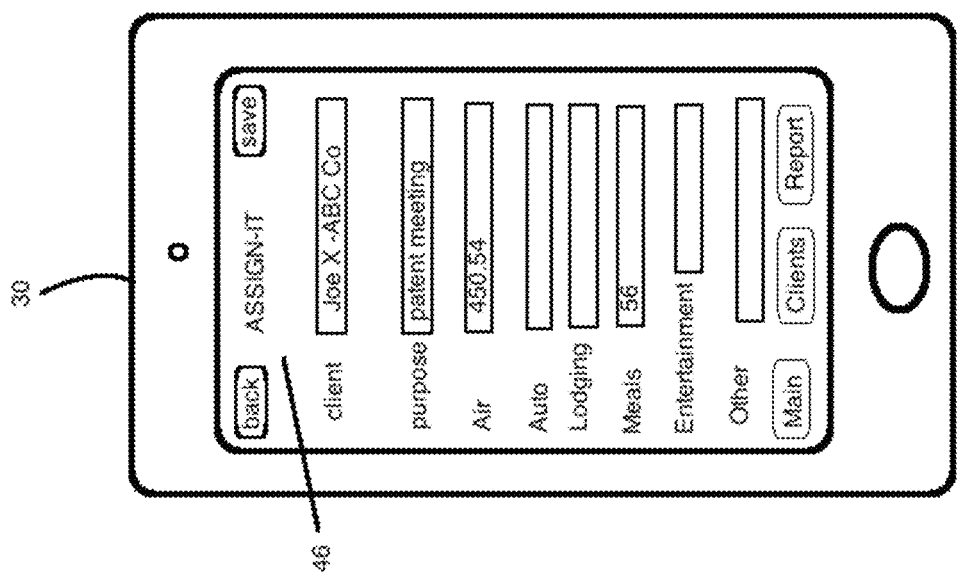
FIG. 4B depicts a hand held device of the invention showing a sixth screen.

For example, the user can manually assign the expense by touching the "Assign-It" button 44 which bring up screen 46 seen in FIGS. 4A and 4B. The transaction information data 36 is manipulated back to human readable form and the screen permits editing, addition, deletion of various other items expenses. In the event, no computer readable code is provided for scanning, this button enables manual entry of data.

The expense transaction software 17 is also preferably equipped enable input of data into a file, such as a note regarding the transaction, or enables associating personal or client data with a particular transaction. It is further contemplated that the expense transaction software 17 instant invention can be fully compatible to import/export data, such as client data, company and personal data, and transaction information data, report data, etc. with such programs as Quicken®, Quickbooks® and Peachtree® accounting, for example, or other accounting programs.

Another aspect of the invention is as follows. It is contemplated that the transaction data on both phone and processor, method for performing transaction can be implemented via a suitable electronic method NFC, bluetooth, optic device, etc. The invention can operate as a middle layer system, independent of method of transaction, but after a point in which transaction data is complete, thus the instant invention provides software computer based system which is initiated to perform the categorization of expense items from the transaction information data and permit tagging, e.g., editing or noting of data for later use, such as reporting. The middle layer system of the invention can communicate with a bank and/or credit card/debit card transaction database to streamline the data for its end of period (e.g., month or year) reporting use.

In this regard an example is as follows: the smart phone is equipped with American Express® Credit card information and the NFC provides a transaction to be completed where the processor at the transaction point communicates with remotely located processor of American Express to approve the transaction. American Express processor captures the transaction information data and categorizes the transaction information by date, time, merchant type, goods/services, etc. The transaction expense software of the instant invention initiated the smart phone permits the tagging of such transaction information data and can optionally locally store on the phone using transaction expense software or transmit data to the remotely located processor of American Express for further categorization using the tagged data. For example, it can include a note concerning the transaction, a client/matter to be assigned with the transaction information data. Optionally, the American Express can categorize said transactional data and send to the smart phone real time and permit tagging such data which has been sorted using categorization done by American Express.

A typical transaction information data from American Express will appear "Dec. 1, 2012 Alamo Car Rental NY $125" and the transaction expense software will will receive the information and be prompted to tag the transaction information data at the transaction point as "Business or Personal" and then permitted to tag further data such as purpose of the meeting, or purchase and tag it to a particular client/company. This data can be stored locally on the phone and/or on the remotely located processor of American Express, for example. Thus, all credit card transactions can be quickly and conveniently recorded as business or personal expenses. In addition, cash transactions can also be recorded by the transaction expense software of the invention, thereby providing the ability to provide a detailed expense report.

It is contemplated that the expense transaction software can be an application running in the background of the smart phone, for example, constantly running in background, which can be turned off and on, and capture transactional information data and transmit the same as they occur.

The above described invention is not intended to be limited by the above disclosure, but rather intended to encompass the full scope of the invention including modifications, improvements and derivations thereto.

What is claimed:

1. A system for processing a transaction by a user at a transaction point, the system comprising:
a processor disposed at the transaction point, the processor being configured to detect an initiation of the transaction by the user and generate transaction information data corresponding to the transaction;
a communication device associated with the processor, the communication device configured to transmit the transaction information data;
a remote processor configured to receive the transaction information data and store the transaction information data in a database; and
a hand held device disposed in communication with the communication device, the hand held device configured to:
store transaction authority data;
receive the transaction information data from the communication device;
enable the transaction at the transaction point based on the transaction information data and the transaction authority data;
automatically displaying and prompting a user on said hand held device at said transaction point for tagging said transaction data at said transaction point as one of personal or business with tagging to a particular client, creating tagged transaction information data,
receive a user input indicative of the transaction being one of a personal transaction or a business transaction with tagging to a particular client; and
transmit the user input to the remote processor,
wherein the remote processor is further configured to tag the stored transaction information data in the database based on the user input as one of a personal transaction or a business transaction thereby transforming transaction information data on said remote database through electronic communication therebetween.

2. The system for completing a transaction and tagging and tracking expenses by a user at a transaction point of claim 1, wherein said hand held computer based device is a smart phone.

3. The system for completing a transaction and tagging and tracking expenses by a user at a transaction point of claim 2, wherein said first processor and said hand held computer based device include near field communication devices for transmitting and receiving transaction authority data which is transmitted between said near field communication device for purpose of enabling said purchase transaction.

4. The system for completing a transaction and tagging and tracking expenses by a user at a transaction point of claim 1, wherein said transaction information data includes at least amount data of said transaction, date data, merchant data, good and/or service data.

5. The system for completing a transaction and tagging and tracking expenses by a user at a transaction point of claim 4, wherein said hand held computer based device receives said transaction information data from one of said first processor at said transaction point and said credit card company process.

* * * * *